United States Patent
Yakabe et al.

(10) Patent No.: US 10,436,989 B2
(45) Date of Patent: Oct. 8, 2019

(54) OPTICAL CONNECTOR FERRULE AND OPTICAL CONNECTOR

(71) Applicant: Sumitomo Electric Industries, Ltd., Osaka-shi (JP)

(72) Inventors: Sho Yakabe, Yokohama (JP); Takuro Watanabe, Yokohama (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

(21) Appl. No.: 16/070,818

(22) PCT Filed: Feb. 14, 2017

(86) PCT No.: PCT/JP2017/005312
§ 371 (c)(1),
(2) Date: Jul. 18, 2018

(87) PCT Pub. No.: WO2017/141904
PCT Pub. Date: Aug. 24, 2017

(65) Prior Publication Data
US 2019/0056555 A1    Feb. 21, 2019

(30) Foreign Application Priority Data
Feb. 16, 2016    (JP) ................. 2016-026934

(51) Int. Cl.
*G02B 6/36* (2006.01)
*G02B 6/38* (2006.01)
*G02B 6/32* (2006.01)

(52) U.S. Cl.
CPC .............. *G02B 6/385* (2013.01); *G02B 6/32* (2013.01); *G02B 6/3826* (2013.01); *G02B 6/3834* (2013.01); *G02B 6/3853* (2013.01); *G02B 6/3885* (2013.01); *G02B 6/3644* (2013.01); *G02B 6/3672* (2013.01)

(58) Field of Classification Search
CPC ...... G02B 6/32; G02B 6/3853; G02B 6/3885; G02B 6/4214; G02B 6/4292; G02B 6/36
See application file for complete search history.

(56) References Cited

U.S. PATENT DOCUMENTS

2012/0093462 A1    4/2012 Childers et al.
2016/0282562 A1*   9/2016 Takamizawa .......... G02B 6/325

FOREIGN PATENT DOCUMENTS

| JP | 04-324406 A | 11/1992 |
|---|---|---|
| JP | 2006-235262 A | 9/2006 |
| WO | 2016/148896 A1 | 9/2016 |

* cited by examiner

*Primary Examiner* — Jennifer Doan
(74) *Attorney, Agent, or Firm* — Baker Botts L.L.P.; Michael A. Sartori

(57) ABSTRACT

An optical connector ferrule includes optical fiber holding hole holding an inserted optical fiber, a ferrule end face facing a coupled-side optical connector ferrule, a lens structure provided on an axis line of the optical fiber holding hole on the ferrule end face, and an inspection hole formed along the optical fiber holding hole. The ferrule end face is flat on at least an axis line of the inspection hole, and refractive-index distribution in an area between the ferrule end face and a back side thereof is uniform.

19 Claims, 12 Drawing Sheets

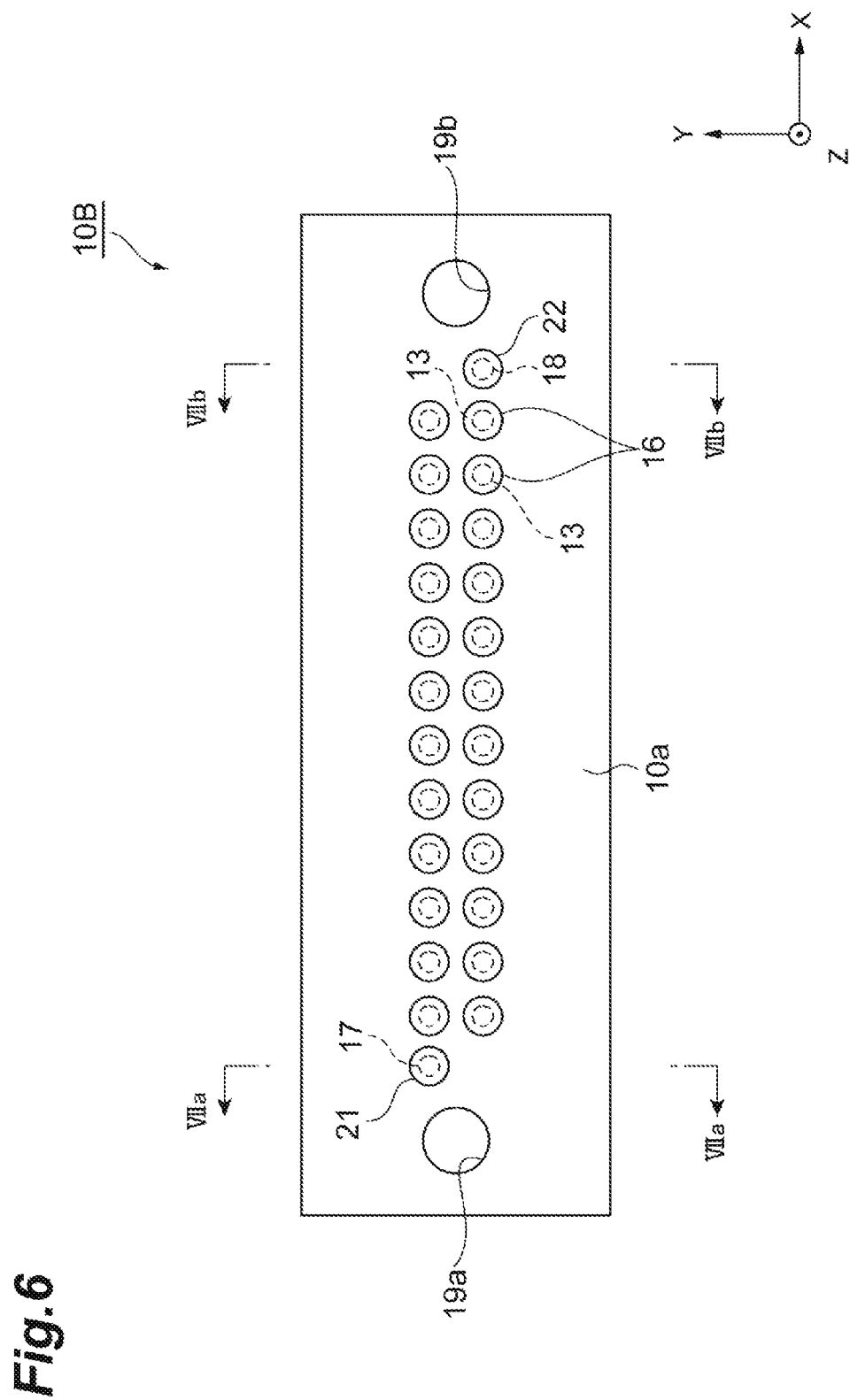

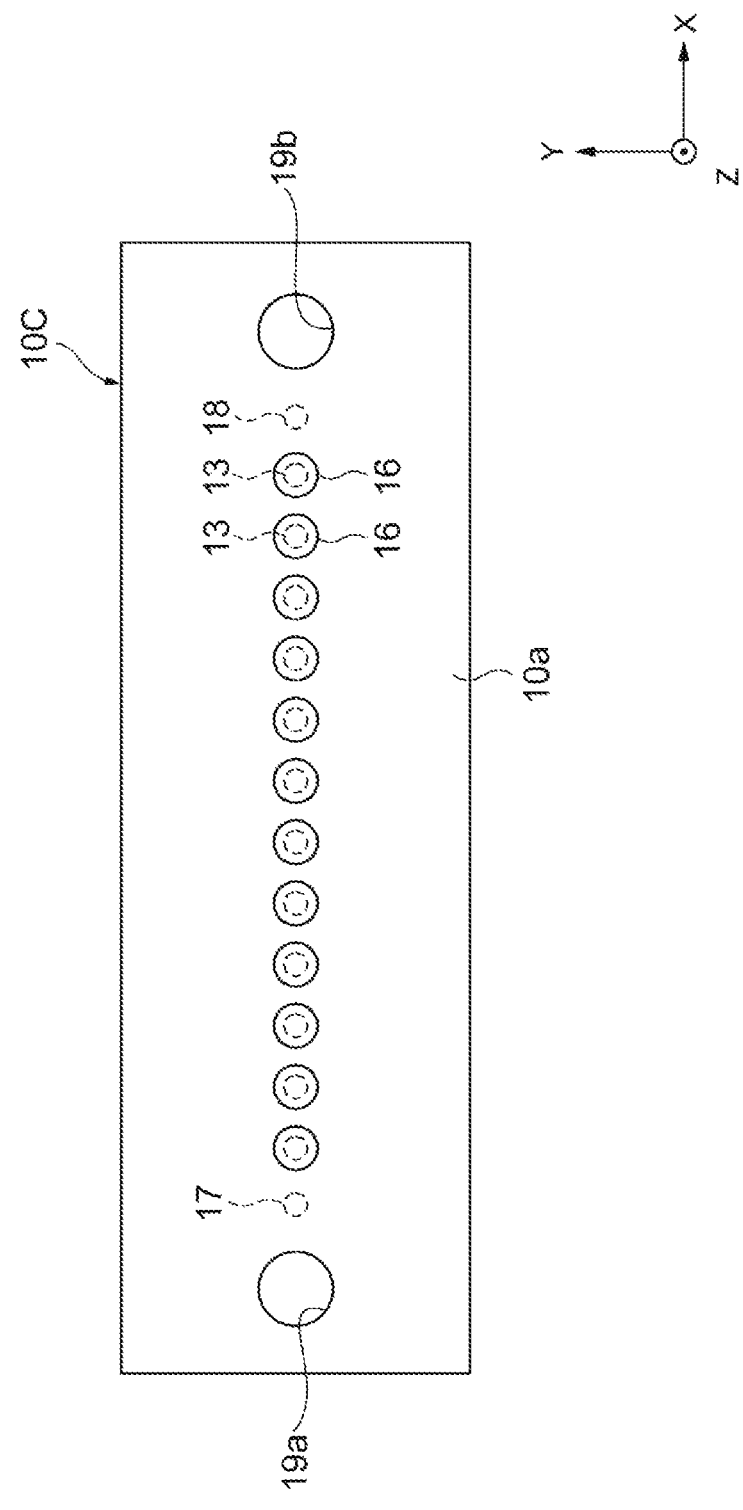

OPTICAL CONNECTOR FERRULE AND OPTICAL CONNECTOR

TECHNICAL FIELD

The present invention relates to an optical connector ferrule and an optical connector.

BACKGROUND ART

Patent Literature 1 discloses a ferrule used for an optical connector which connects multiple optical fibers with each other. This ferrule includes a plurality of holes for holding a plurality of optical fibers, an inner surface in contact with tip ends of the plurality of optical fibers to position the tip ends, a depressed part provided on a front side on an inner surface of an end face, and lenses integrally formed with the depressed part.

CITATION LIST

Patent Literature

Patent Literature 1: U.S. Patent Application Publication No. 2012/0093462

SUMMARY OF INVENTION

Technical Problem

Eccentricity of an optical fiber holding hole (deviation of a central axis line position) in an optical connector ferrule may cause optical coupling efficiency to decrease in some cases. In an optical connector ferrule in which an optical fiber holding hole reaches a front end face (that is, an optical fiber exposes on the front end face), the eccentricity of the optical fiber holding hole can be easily known by observing from the front. However, for example, in a case that lenses are arranged in front of an optical fiber holding hole as described in Patent Literature 1, the lenses disturb observation of the optical fiber holding hole to make it difficult to know the eccentricity of the optical fiber holding hole.

The present invention has an object to provide an optical connector ferrule and an optical connector in which eccentricity of an optical fiber holding hole can be easily known even in a case that a lens structure is provided in front of the optical fiber holding hole.

Solution to Problem

In order to solve the above problem, an optical connector ferrule according to an embodiment of the invention is an optical connector ferrule made of resin. The optical connector ferrule includes an optical fiber holding hole which is a through-hole reaching a first surface and holds an inserted optical fiber, a lens structure provided on an axis line of the optical fiber holding hole, and an inspection hole which is a through-hole formed along the optical fiber holding hole and reaches the first surface.

Advantageous Effects of Invention

According to the present invention, the eccentricity of the optical fiber holding hole can be easily known even in the case that the lens structure is provided in front of the optical fiber holding hole.

BRIEF DESCRIPTION OF DRAWINGS

FIG. 6 is a front view of an optical connector ferrule according to a first modification of the above embodiment.

FIG. 8 is a front view of an optical connector ferrule according to a second modification.

DESCRIPTION OF EMBODIMENTS

Description of Embodiments of Present Invention

Figure 1:
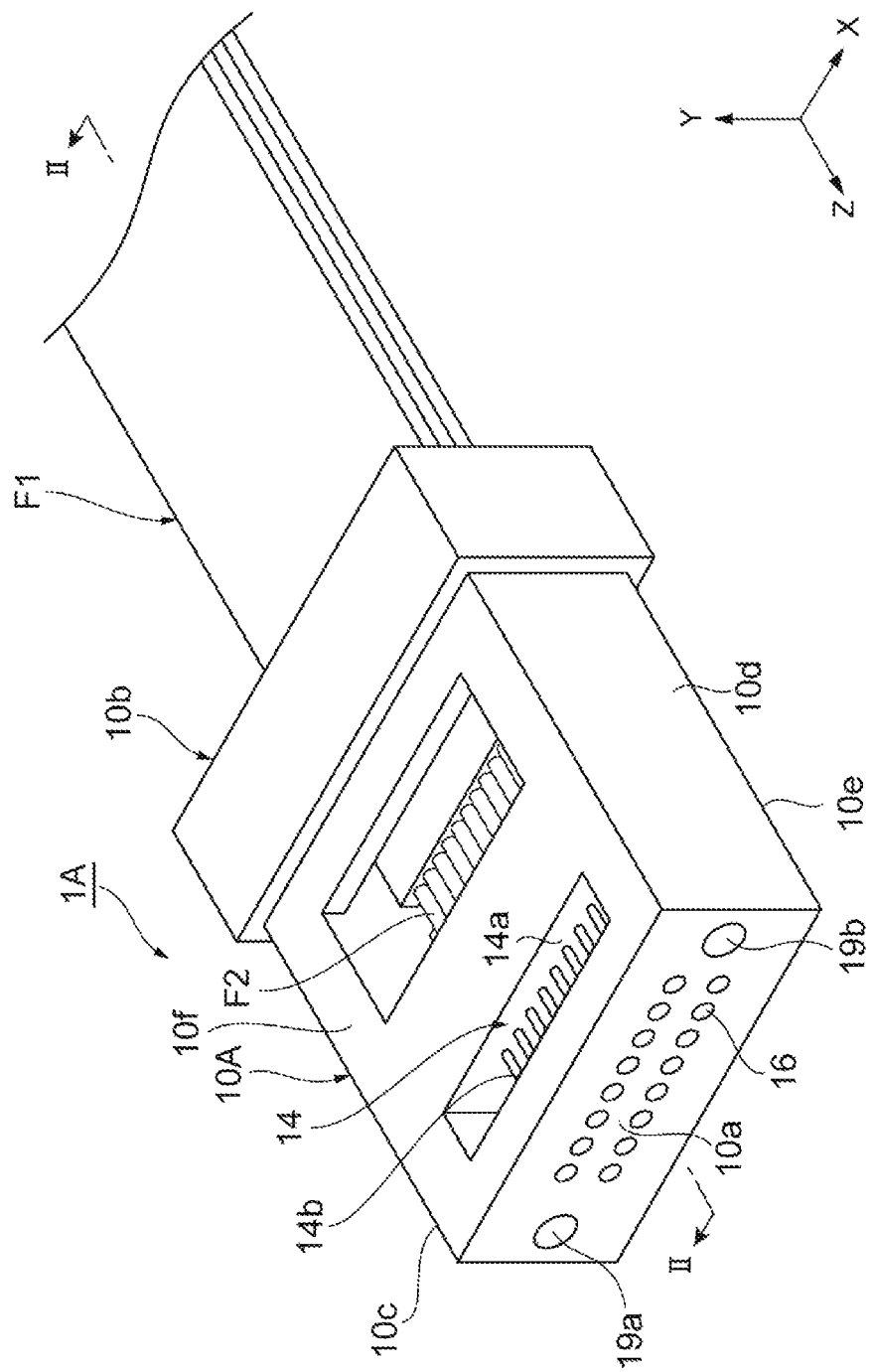
FIG. 1 is a perspective view illustrating an outer appearance of an optical connector including an optical connector ferrule according to an embodiment of the present invention.

First, contents of embodiments of the present invention are listed and described. An optical connector ferrule according to an embodiment of the present invention is an optical connector ferrule made of resin. The optical connector ferrule includes an optical fiber holding hole which is a through-hole reaching a first surface and holds an inserted optical fiber, a lens structure provided on an axis line of the optical fiber holding hole, and an inspection hole which is a through-hole formed along the optical fiber holding hole and reaches the first surface.

In the above optical connector ferrule, an optical fiber is inserted into and held in the optical fiber holding hole. Then, light emitted from a tip end face of the optical fiber is collimated by the lens structure to reach a coupled-side optical connector. The light collimated and emitted from the coupled-side optical connector is condensed by the lens structure to reach the tip end face of the optical fiber. Therefore, according to the above optical connector ferrule, efficient optical coupling with the coupled-side optical connector can be made.

The above optical connector ferrule has also an inspection hole different from the optical fiber holding hole. The inspection hole is a through-hole reaching the first surface similarly to the optical fiber holding hole and is formed along the optical fiber holding hole. According to such a configuration, a rod-shaped mold for forming the optical fiber holding hole and a rod-shaped mold for forming the inspection hole can be extended from a shared base. In such a case, deviation in a relative position between the inspection hole and the optical fiber holding hole is made extremely small. Eccentricity of the inspection hole can be easily known by observing from the front without being disturbed by the lens structure. In other words, according to the above optical connector ferrule, eccentricity of the optical fiber holding hole can be easily known by means of the eccentricity of the inspection hole.

The above optical connector ferrule may further includes a second surface facing the first surface, and a ferrule end face positioned on a back side of the second surface and facing a coupled-side optical connector ferrule. The lens structure may be provided at least any of on the second surface, on the ferrule end face, and between the second surface and the ferrule end face. The second surface and the ferrule end face may be flat on at least an axis line of the inspection hole, and refractive-index distribution in an area between the second surface and the ferrule end face may be uniform. In this optical connector ferrule, since the second surface and the ferrule end face are flat on at least the axis line of the inspection hole, and the refractive-index distribution in the area between the second surface and the ferrule end face is uniform, the inspection hole can be further easily observed from the front.

In the above optical connector ferrule, an inner diameter of the inspection hole may be equal to an inner diameter of the optical fiber holding hole. This allows a rod-shaped mold for forming the optical fiber holding hole and a rod-shaped mold for forming the inspection hole to be shared to reduce kinds of molds. In a case that thicknesses of these molds are different, degrees of deflections of the molds when melted resin flows are differentiated to affect relative positional accuracy between the inspection hole and the optical fiber holding hole. The inner diameter of the inspection hole being equal to the inner diameter of the optical fiber holding hole makes it possible to equalize the thicknesses of these molds to cause the deflections to be the same degree and heighten the relative positional accuracy of each other.

In the above optical connector ferrule, the optical fiber holding hole may include a plurality of holding holes, the lens structure may include a plurality of lenses respectively provided on axis lines of the respective holding holes, and the inspection hole may include first and second inspection holes. Openings of the plurality of holding holes on the first surface may be formed to be aligned in one row or a plurality of rows, an opening of the first inspection hole on the first surface may be formed alongside of one end of any of the rows and an opening of the second inspection hole on the first surface may be formed alongside of the other end of any of the rows. This allows the inspection holes to be arranged without disturbing the alignment of the optical fiber.

The above optical connector ferrule may further include a mark for positional adjustment with respect to the inspection hole, the mark being provided at least any of on the second surface, on the ferrule end face, and between the second surface and the ferrule end face. Such a mark may be formed at the same time by the mold for forming the lens structure, and thus, deviation in a relative position between the mark and the lens structure is made extremely small. Then, the mark and the inspection hole appear to overlap each other when observed from the front. Therefore, relative positional deviation between the optical fiber holding hole and the lens structure can be easily known by observing relative positional deviation between the mark and the inspection hole.

In this case, the mark may be formed into a protruded shape having a flat part overlapping the axis line of the inspection hole. In this case, a mold portion for forming the mark has a depressed shape, and therefore, the mold portion for forming the mark can suppress stagnation of a flow of melted resin to preferably form the lens structure.

The mark may have on a circular shape when viewed in a direction of the axis line of the inspection hole. This makes it possible to easily find relative positional deviation between the mark and the inspection hole. Such an effect is more noticeable when a diameter of the mark is different from an inner diameter of the inspection hole.

Details of Embodiments of Present Invention

Specific examples of the optical connector ferrule according to the embodiments of the present invention are described below with reference to the drawings. The present invention is not limited to the examples but intended to be defined by the scope of the appended claims and include the equivalents of the scope of the appended claims and all modifications within the scope of the appended claims. In the following description, the same components in description of the drawings are designated by the same reference signs, and the duplicated description is omitted. In the following description, a description is given assuming that a width direction of the optical connector ferrule is an X direction, a height direction is a Y direction, and a direction crossing the X direction and Y direction (a connection direction of the optical connector) is a Z direction.

Figure 2:
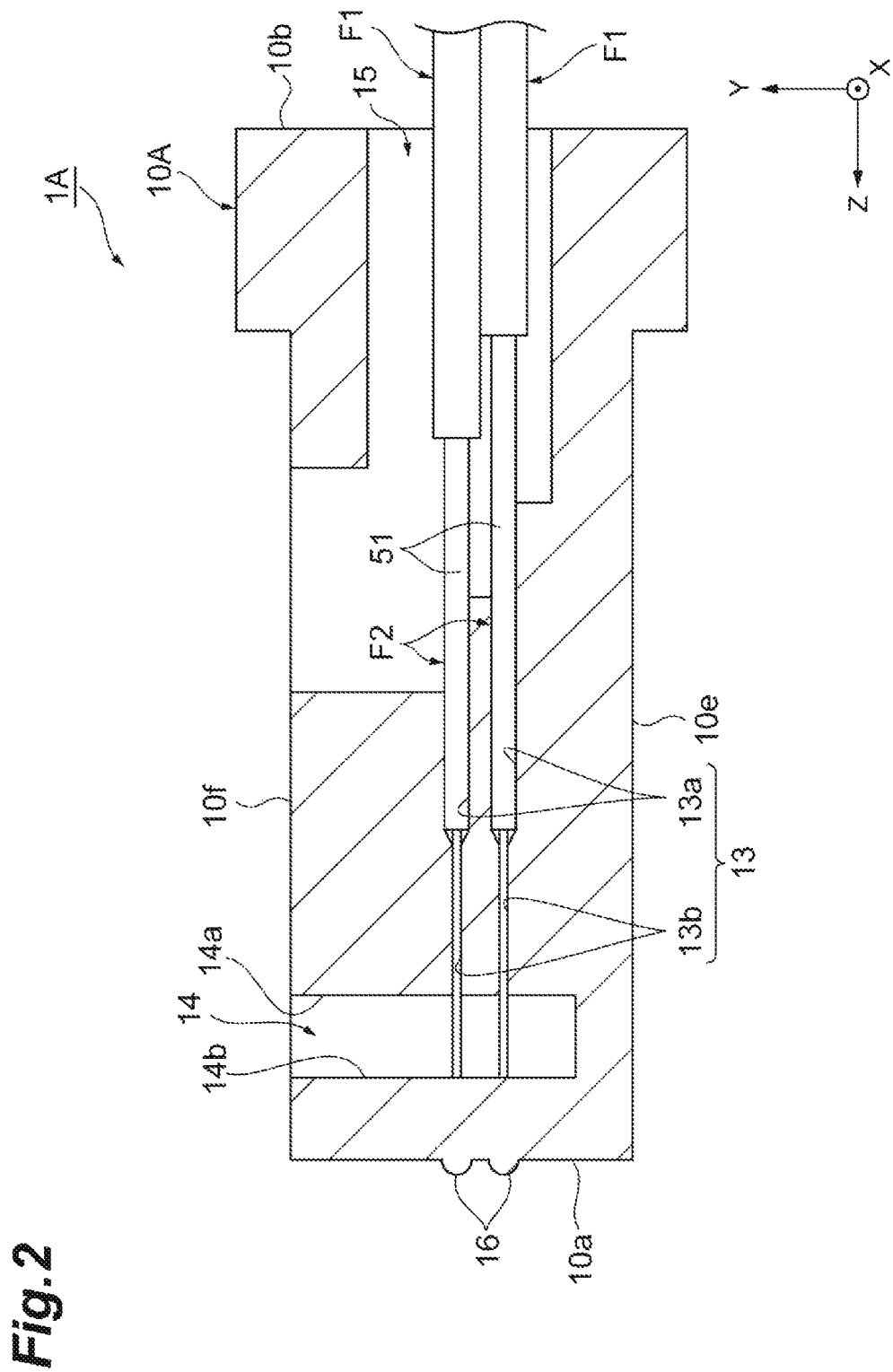
FIG. 2 is a cross-sectional view taken along a line II-II of the optical connector ferrule illustrated in FIG. 1.

FIG. 1 is a perspective view illustrating an outer appearance of an optical connector 1A including an optical connector ferrule according to an embodiment of the present invention. FIG. 2 is a cross-sectional view taken along a line II-II illustrated in FIG. 1. The optical connector 1A holds (fixes) a multiple optical fiber bundle F1 and an end face of itself faces an end face of a coupled-side optical connector which similarly holds optical fibers to optically link the optical fibers with each other. The optical connector 1A includes an optical connector ferrule 10A (hereinafter, simply referred to as "a ferrule") which holds the optical fiber bundle F1 and is made of resin. The resin making the optical connector ferrule 10A is composed of resin having a light transmission property, for example.

As is illustrated in FIG. 1 and FIG. 2, the ferrule 10A has an outer appearance formed into a substantially rectangular parallelepiped shape. Specifically, the ferrule 10A has a ferrule end face 10a which is provided on one end side in the connection direction (Z direction) and faces the coupled-side optical connector, and a rear end face 10b which is provided on the other end side. The ferrule 10A has a pair of lateral faces 10c and 10d, a bottom face 10e, and a top face 10f extending along the Z direction. On the rear end face 10b, an introducing hole 15 is formed which takes in the optical fiber bundle F1 bundling a plurality of optical fibers F2.

The ferrule 10A further has a depressed part 14 formed from the top face 10f toward the bottom face 10e. As illustrated in FIG. 2, a surface 14a, on the rear end face 10b side, among inner surfaces configuring the depressed part 14 is an example of a first surface in the embodiment and is a flat face along an X-Y plane. A surface 14b, on the ferrule end face 10a side, among the inner surfaces configuring the concave part 14 is an example of a second surface in the embodiment and is a flat face facing the surface 14a and along the X-Y plane (i.e., a surface in parallel with the surface 14a). The ferrule end face 10a is positioned on a back side of the surface 14b.

The ferrule 10A further includes a plurality of optical fiber holding holes 13. Each of a plurality of optical fiber holding holes 13 is a through-hole extending from the introducing hole 15 and reaching the surface 14a, and is formed with an axis line direction being the Z direction. Each optical fiber holding hole 13 holds the inserted optical fiber F2. Openings of the plurality of optical fiber holding holes 13 on the surface 14a are formed to be aligned in one row or a plurality of rows. The optical fiber holding holes 13 in the embodiment are formed in multiple tiers (e.g., two tiers) in the Y direction, and a plurality of optical fiber holding holes 13 in each tier are arranged to be aligned in the X direction.

Each optical fiber holding hole 13 includes a large diameter portion 13a which is formed adjacent to the introducing hole 15 and a small diameter portion 13b which is continuous with the large diameter portion 13a and formed adjacent to the surface 14a. The large diameter portion 13a holds a part of the optical fiber F2 covered by a covering 51, and the small diameter portion 13b holds a part of the optical fiber F2 from which the covering 51 is removed (bare fiber). The optical fiber F2 held in the small diameter portion 13b protrudes and extends from the surface 14a toward the front in the Z direction, and a tip end face thereof is in contact with the surface 14b.

The ferrule 10A further includes a plurality of lens structures 16. Each of a plurality of lens structures 16 is a semispherical convex part formed on the ferrule end face 10a, and is integrally formed with the other portion of the ferrule 10A. Each of a plurality of lens structures 16 is provided on the axis line of the optical fiber holding hole 13 corresponding to each lens structure, and is optically coupled with the respective tip end faces of a plurality of optical fibers F2 held by the optical fiber holding hole 13. Each lens structure 16 collimates light emitted from the tip end face of each optical fiber F2, or condenses light entering from the coupled-side optical connector onto the tip end face of each optical fiber F2.

The ferrule 10A further includes a pair of guide holes 19a and 19b. The guide holes 19a and 19b are formed to be aligned in the X direction to sandwich a plurality of lens structure 16 on the ferrule end face 10a. Into the guide holes 19a and 19b, a guide pin for fixing a relative position with respect to a coupled-side connector is inserted.

Figure 3:
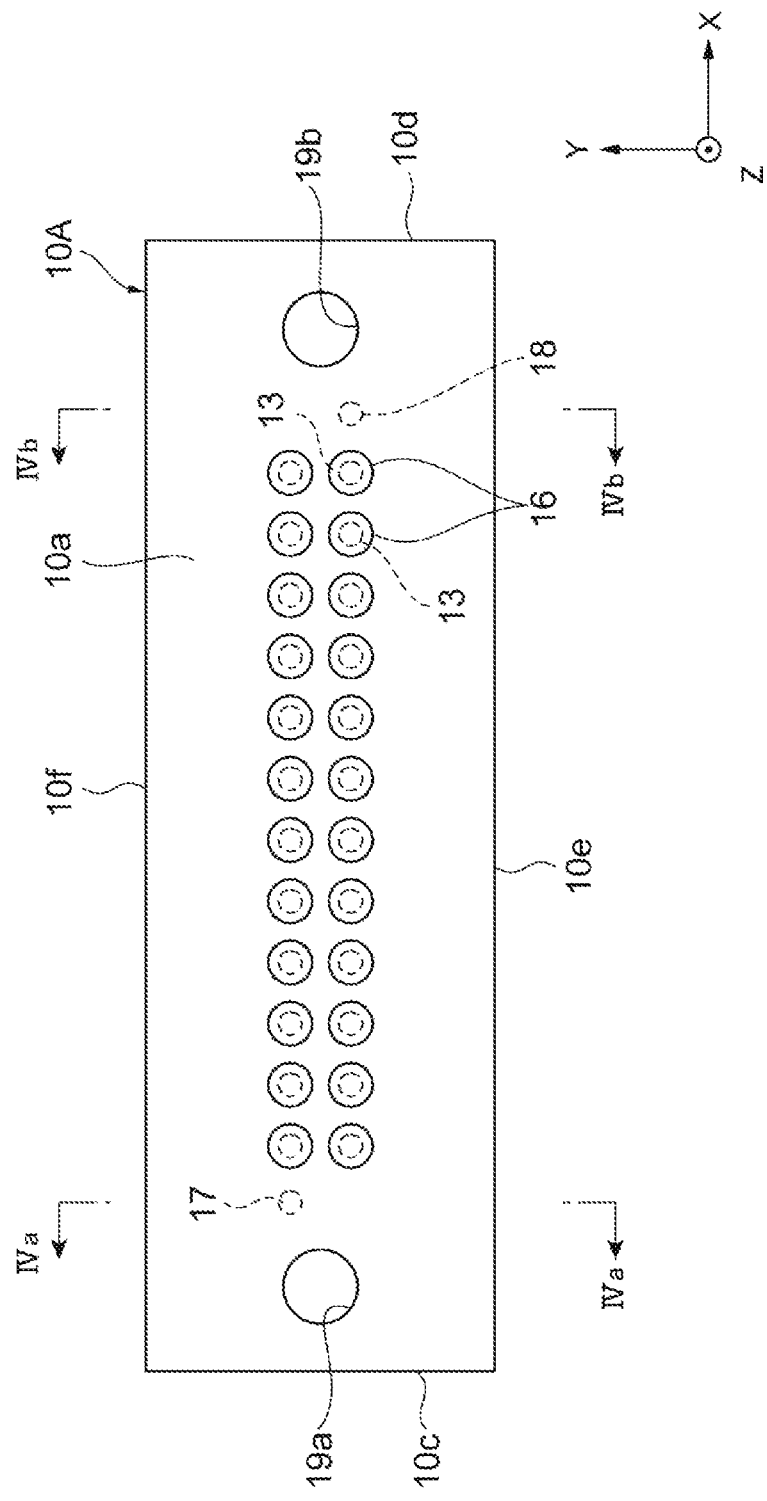
FIG. 3 is a front view of the optical connector ferrule.
Figure 4A:
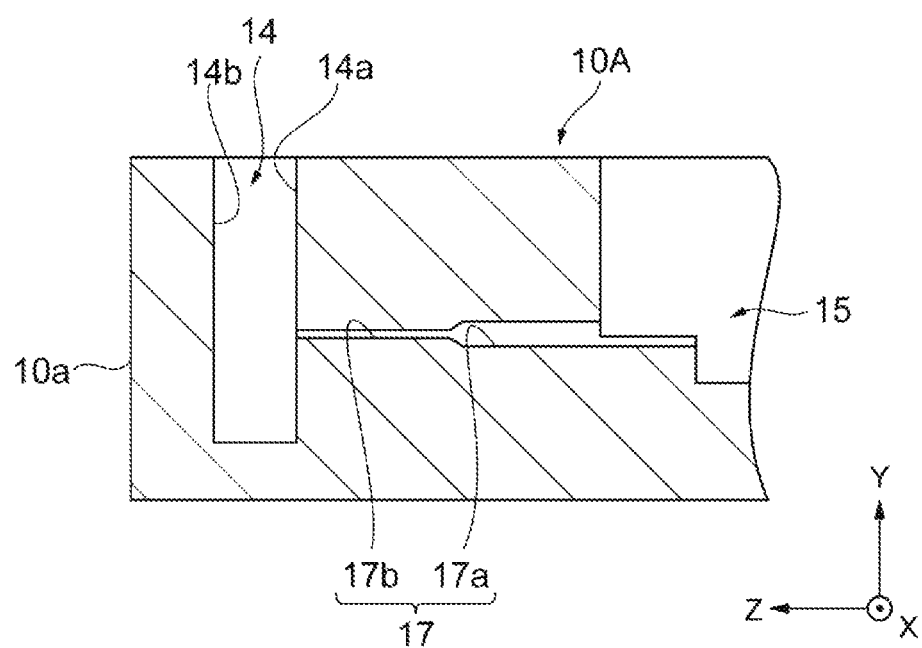
FIG. 4A is a cross-sectional view taken along a line IVa-IVa illustrated in FIG. 3.
Figure 4B:
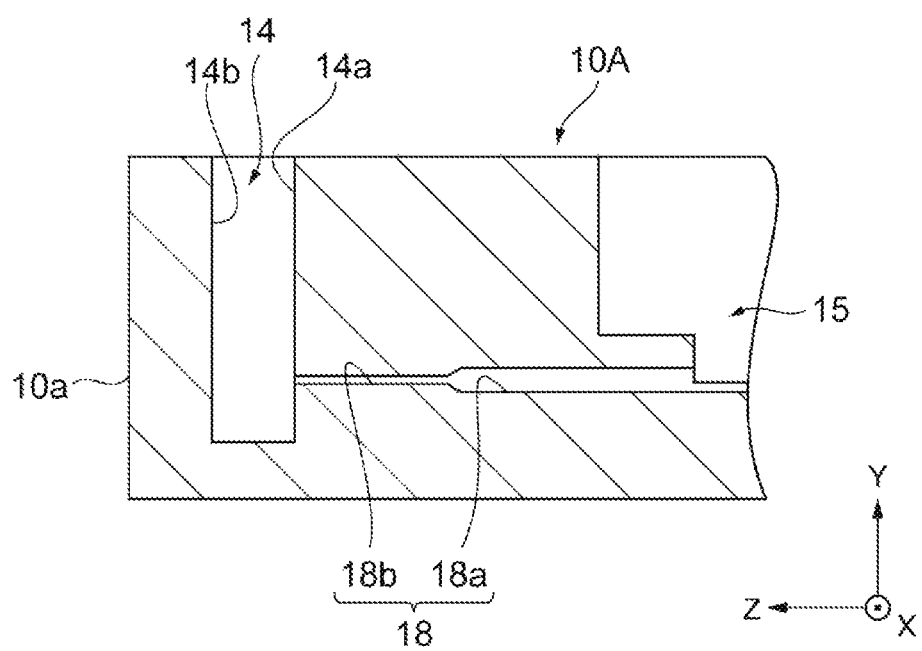
FIG. 4B is a cross-sectional view taken along a line IVb-IVb illustrated in FIG. 3.

Here, FIG. 3 is a front view of the ferrule 10A. FIG. 4A is a cross-sectional view taken along a line IVa-IVa illustrated in FIG. 3, and FIG. 4B is a cross-sectional view taken along a line IVb-IVb illustrated in FIG. 3. As illustrated in FIG. 3, FIG. 4A, and FIG. 4B, the ferrule 10A further includes, in addition to a plurality of optical fiber holding holes 13, a first inspection hole 17 and a second inspection hole 18. Each of these inspection holes 17 and 18 is a through-hole extending from the introducing hole 15 and reaching the surface 14a, and is formed with an axis line direction being the Z direction along the optical fiber holding hole 13. Specifically, the inspection holes 17 and 18 respectively include large diameter portions 17a and 18a which are formed on the introducing hole 15 side, and small diameter portions 17b and 18b which are continuous with the large diameter portions 17a and 18a and formed toward the surface 14a, similarly to the optical fiber holding hole 13. Inner diameters of the large diameter portions 17a and 18a are equal to the inner diameter of the large diameter portion 13a of the optical fiber holding hole 13, and inner diameters of the small diameter portions 17b and 18b are equal to the inner diameter of the small diameter portion 13b of the optical fiber holding hole 13.

Both the surface 14b and the ferrule end face 10a are flat on at least the axis lines of the inspection holes 17 and 18, and refractive-index distribution in an area between the surface 14b and the ferrule end face 10a is uniform. In other words, no light condensing optical element such as the lens structure 16, for example, is provided near the axis lines of the inspection holes 17 and 18.

As illustrated in FIG. 3, an opening of the first inspection hole 17 on the surface 14a is formed alongside of one end of a row of the optical fiber holding holes 13 in a first tier. An opening of the second inspection hole 18 on the surface 14a is formed alongside of other end of a row of the optical fiber holding holes 13 in a second tier.

Figure 5:
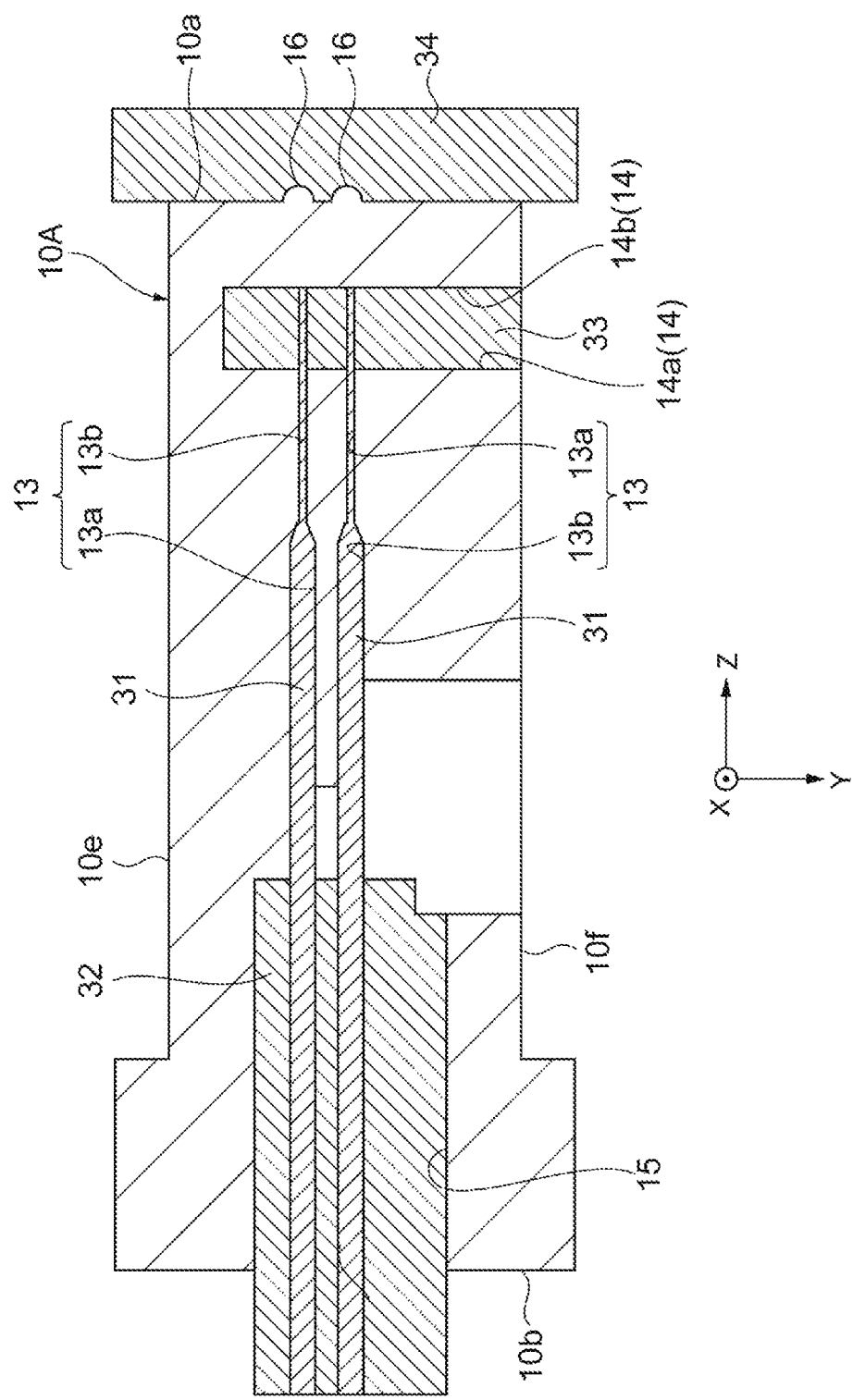
FIG. 5 is a cross-sectional view illustrating a process for manufacturing the optical connector ferrule.

FIG. 5 is a cross-sectional view illustrating a process for manufacturing the ferrule 10A. In FIG. 5, some of molds, 31 to 34, for molding the ferrule 10A are illustrated. The mold 31 is a rod-shaped mold for forming the optical fiber holding hole 13, and extends in the Z direction. A plurality of molds 31 are provided depending on the number of optical fiber holding holes 13. A mold for forming the inspection holes 17 and 18 has the same shape as the mold 31, and are arranged to be aligned with these molds 31. One end of each of the molds 31 and molds for forming the inspection holes 17 and 18 is held by the mold 32 for forming the introducing hole 15, and other end of each of these is held by the mold 33 for forming the depressed part 14. Then, the mold 34 is provided separately from these molds 31 to 33. The mold 34 is a mold for forming the ferrule end face 10a and lens structure 16. The ferrule 10A may be formed using molds which include at least these molds 31 to 34.

Effects obtained from the ferrule 10A having the above structure according to the embodiment are described. In the ferrule 10A, the optical fiber F2 is inserted into and held in the optical fiber holding hole 13. Then, light emitted from the tip end face of the optical fiber F2 is collimated by the lens structure 16 to reach the coupled-side optical connector. The light collimated and emitted from the coupled-side optical connector is condensed by the lens structure 16 to reach the tip end face of the optical fiber F2. Therefore, according to the ferrule 10A, efficient optical coupling with the coupled-side optical connector can be made.

The ferrule 10A according to the embodiment also has the inspection holes 17 and 18 in addition to the optical fiber holding hole 13. Each of the inspection holes 17 and 18 is a through-hole reaching the surface 14a similarly to the optical fiber holding hole 13 and is formed along the optical fiber holding hole 13. According to such a configuration, the rod-shaped mold 31 for forming the optical fiber holding hole 13 and the rod-shaped mold for forming the inspection holes 17 and 18 can be extended from a shared base (mold 32). Additionally, in the embodiment, the other end of each of these molds is held by the mold 33. Therefore, deviation in a relative position between the inspection holes 17 and 18 and the optical fiber holding hole 13 is made extremely small. Eccentricity of the inspection holes 17 and 18 can be easily known by observing from the front without being disturbed by the lens structure 16. In other words, according to the ferrule 10A in the embodiment, eccentricity of the optical fiber holding hole 13 can be easily known by means of the eccentricity of the inspection holes 17 and 18.

In the ferrule 10A according to the embodiment, the lens structure 16 is provided on the ferrule end face 10a, the surface 14b and the ferrule end face 10a are flat on at least the axis lines of the inspection holes 17 and 18, and refractive-index distribution in an area between the surface 14b and the ferrule end face 10a is uniform. This suppresses distortion of images of the inspection holes 17 and 18 viewed from the front, and the inspection holes 17 and 18 are further easily observed.

The inner diameters of the inspection holes 17 and 18 may be equal to the inner diameter of the optical fiber holding hole 13 as in the present embodiment. This allows the rod-shaped mold 31 for forming the optical fiber holding hole 13 and the rod-shaped mold for forming the inspection holes 17 and 18 to be shared to reduce kinds of molds. In a case that thicknesses of these molds are different, degrees of deflections of the molds when melted resin flows are differentiated to affect relative positional accuracy between the inspection holes 17 and 18 and the optical fiber holding hole 13. The inner diameters of the inspection holes 17 and 18 being equal to the inner diameter of the optical fiber holding hole 13 makes it possible to equalize the thicknesses of these molds to cause the deflections to be the same degree and further heighten the relative positional accuracy of each other.

The openings a plurality of optical fiber holding holes 13 on the surface 14a may be formed to be aligned in one row or a plurality of rows. The opening of the first inspection hole 17 on the surface 14a may be formed alongside of one end of any of the rows. The opening of the second inspection hole 18 on the surface 14a may be formed alongside of the other end of any of the rows as in the present embodiment. This allows the inspection holes 17 and 18 to be arranged without disturbing the alignment of the optical fiber F2.

First Modification

Figure 7A:
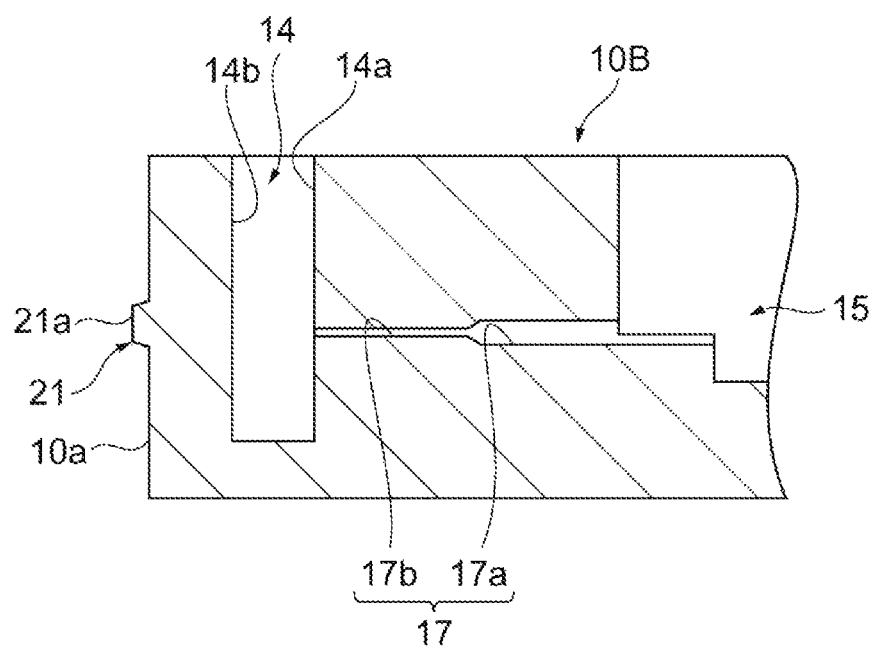
FIG. 7A is a cross-sectional view taken along a line VIIa-VIIa illustrated in FIG. 6.
Figure 7B:
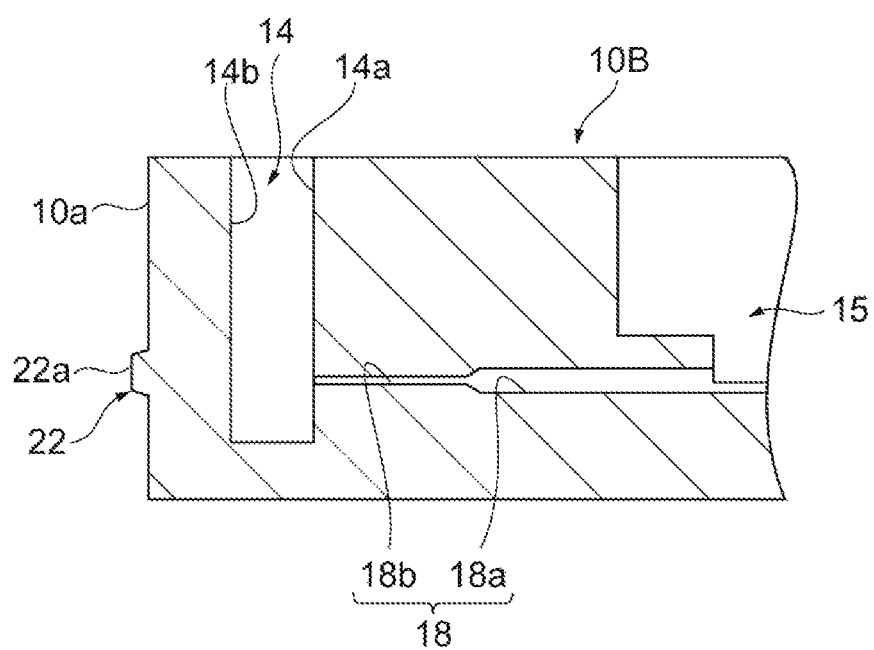
FIG. 7B is a cross-sectional view taken along a line VIIb-VIIb illustrated in FIG. 6.

FIG. 6 is a front view of a ferrule 10B according to a first modification of the above embodiment. FIG. 7A is a cross-sectional view taken along a line VIIa-VIIa illustrated in FIG. 6, and FIG. 7B is a cross-sectional view taken along a line VIIb-VIIb illustrated in FIG. 6. The ferrule 10B according to this modification further includes, in addition to the configuration of the ferrule 10A in the above embodiment, two marks 21 and 22. The mark 21 is provided to an area on the axis line of the inspection hole 17 on the ferrule end face 10a for positional adjustment with respect to the inspection hole 17. Similarly, the mark 22 is provided to an area on the axis line of the inspection hole 18 on the ferrule end face 10a for positional adjustment with respect to the inspection hole 18.

As illustrated in FIG. 7A and FIG. 7B, these marks 21 and 22 are respectively formed into protruded shapes protruding in the axis line direction of the inspection holes 17 and 18, for example, at tops of which marks provided are flat parts 21a and 22a overlapping the axis lines of the inspection holes 17 and 18. As illustrated in FIG. 6, when viewed in the axis line directions of the inspection holes 17 and 18, the marks 21 and 22 take on circular shapes, centers of which coincide with central axis lines of the inspection holes 17 and 18, respectively, in terms of design. Further, diameters of the marks 21 and 22 (specifically, diameters of the flat parts 21a and 22a) are different from the inner diameters of the inspection holes 17 and 18, respectively. For example, the diameters of the marks 21 and 22 are formed to be larger than the inner diameters of the inspection holes 17 and 18.

The marks 21 and 22 like this may be formed at the same time by the mold 34 for forming the lens structure 16 (see FIG. 5), and thus, an deviation in relative positions between the marks 21 and 22 and the lens structure 16 is made extremely small. Then, the marks 21 and 22 and the inspection holes 17 and 18 respectively appear to overlap each other when observed from the front. Therefore, relative positional deviation between the optical fiber holding hole 13 and the lens structure 16 can be easily known by observing relative positional deviations between the marks 21 and 22 and the inspection holes 17 and 18. In other words, relative position deviation between the mold 31 and the mold 34 illustrated in FIG. 5 can be adjusted, and inspection of axial misalignment before shipping is enabled.

The marks 21 and 22 may be formed into protruded shapes as in the present modification. This causes a mold portion for forming each of the marks 21 and 22 to have a depressed shape, and therefore, the mold portion for forming each of the marks 21 and 22 can suppress stagnation of a flow of melted resin to preferably form the lens structure 16.

The marks 21 and 22 may take on circular shapes when viewed in the axis line directions of the inspection holes 17 and 18 as in the present modification. In this case, the relative positional deviations between the marks 21 and 22 and the inspection holes 17 and 18 can be easily found by, for example, observing deviations between centers of the circular shaped marks 21 and 22 and centers of the inspection holes 17 and 18. Further, the diameters of the marks 21 and 22 being different from the inner diameters of the inspection holes 17 and 18 prevents profiles of the marks 21 and 22 from overlapping profiles of the inspection holes 17 and 18 when viewed from the front such that the relative positional deviations of these can be easily found.

In this modification, the ferrule end face 10a is provided with the marks 21 and 22, but the mark may be provided to the surface 14b, the area between the surface 14b and the ferrule end face 10a, or two or more of the surface 14b, the ferrule end face 10a, and the area between the surface 14b and the ferrule end face 10a. In this modification, the protruded shaped and circular shaped marks 21 and 22 are illustrated, but the shape of the mark is not limited thereto, and may be various shapes such as a "+" shape, for example.

Second Modification

FIG. 8 is a front view of a ferrule 10C according to a second modification of the above embodiment. In this ferrule 10C, openings of a plurality of optical fiber holding holes 13 on the surface 14a are formed to be aligned in one row in the X direction. An opening of the first inspection hole 17 on the surface 14a is formed alongside of one end of the relevant row, and an opening of the second inspection hole 18 on the surface 14a is formed alongside of other end of the relevant row.

Positions of the openings of inspection holes 17 and 18 are not limited to the above embodiment. The openings can be formed at arbitrary positions on the surface 14a. For example, the openings may be formed on both end sides of the same one row as in the present modification.

Third Modification

Figure 9:
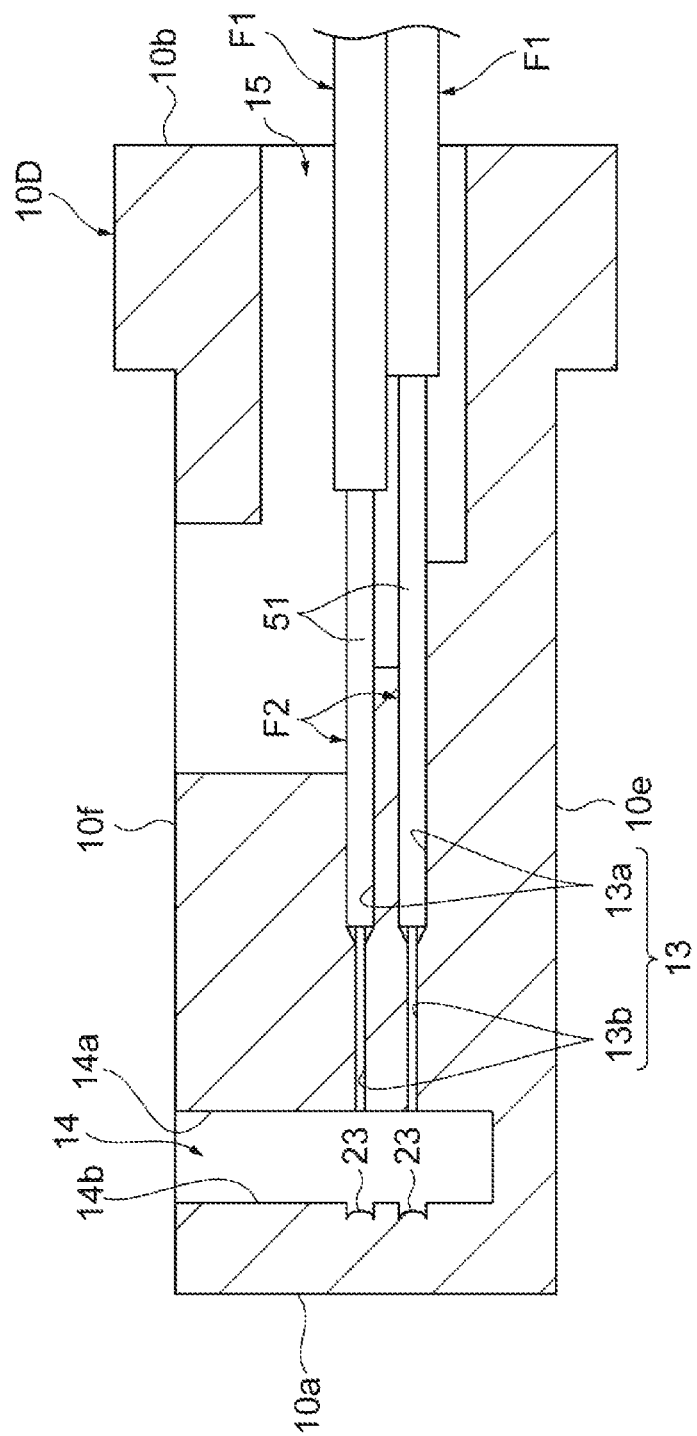
FIG. 9 is a cross-sectional view of an optical connector ferrule according to a third modification.

FIG. 9 is a cross-sectional view of a ferrule 10D according to a third modification of the above embodiment. In this modification, in place of a plurality of lens structures 16 provided on the ferrule end face 10a, a plurality of lens structures 23 are provided on the surface 14b. Specifically, each of a plurality of lens structures 23 includes a semi-spherical convex part formed on the surface 14b, and is integrally formed with the other portion of the ferrule 10D.

Figure 10:
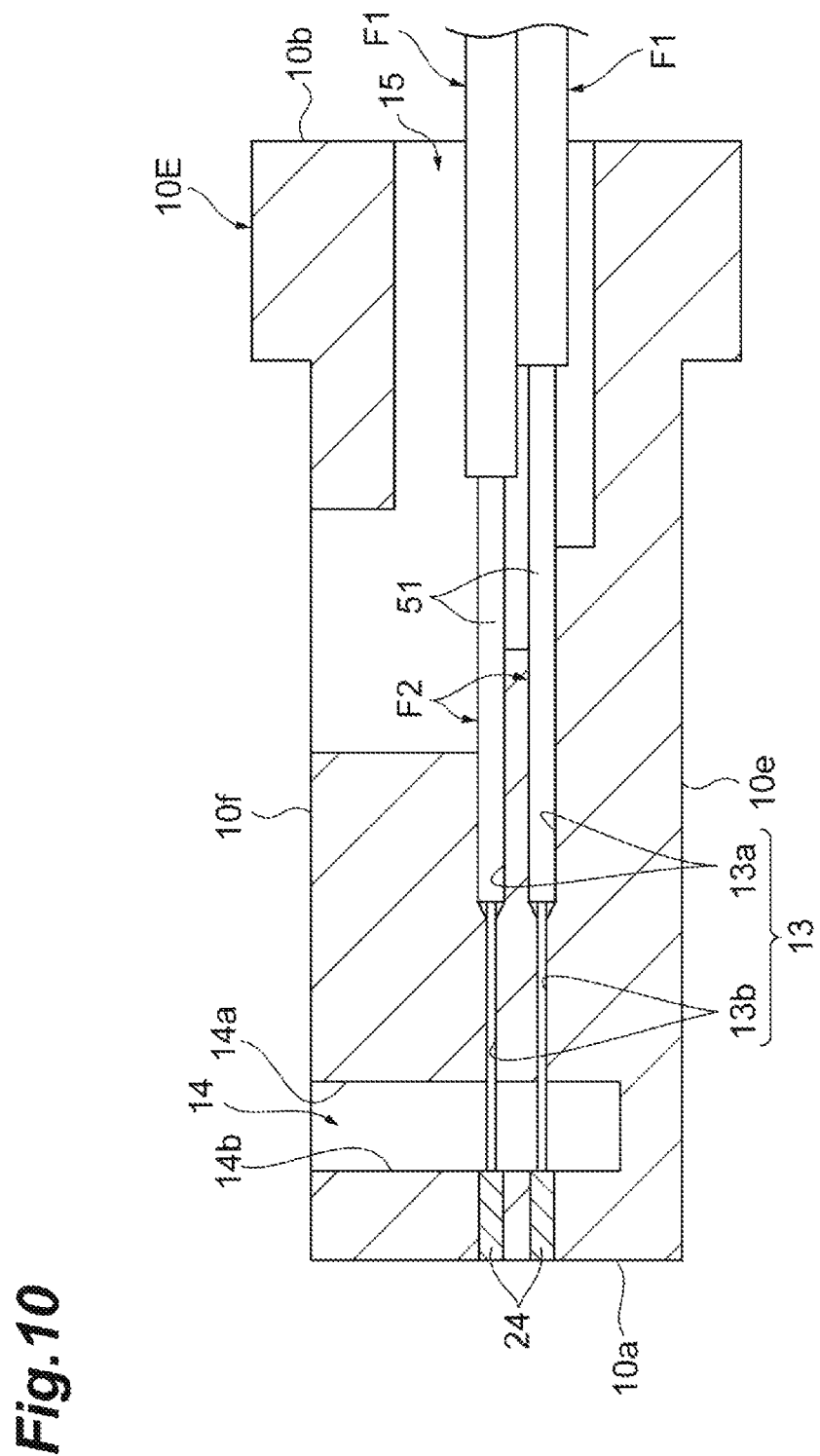
FIG. 10 is a cross-sectional view of an optical connector ferrule according to further another modification.

FIG. 10 is a cross-sectional view of a ferrule 10E according to further another modification. In this modification, in place of a plurality of lens structures 16 provided on the ferrule end face 10a, a plurality of lens structures 24 are provided to the area between the surface 14b and ferrule end face 10a. Specifically, each of a plurality of lens structures 24 is a tubular GRIN lens fitted into a through-hole formed in the area between the surface 14b and the ferrule end face 10a.

Each of these lens structures 23 and 24 is provided on the axis line of the optical fiber holding hole 13 corresponding to each lens structure, and is optically coupled with the respective tip end faces of a plurality of optical fibers F2 held by the optical fiber holding hole 13. Each of the lens structures 23 and 24 collimates light emitted from the tip end face of each optical fiber F2, or condenses light entering from the coupled-side optical connector onto the tip end face of each optical fiber F2.

The lens structure may be provided on the surface 14b, or the area between the surface 14b and the ferrule end face 10a as in the present modification, not limited to the ferrule end face 10a. Alternatively, the lens structure may be provided on two or more of the ferrule end face 10a, the surface 14b, and the area between the surface 14b and the ferrule end face 10a. Even in such a case, the effect similar to that in the above embodiment can be preferably obtained.

The optical connector ferrule according to the present invention is not limited to the above described embodiment, and other various modifications may be adopted. For example, the embodiments described above may be combined with each other depending on required object and effect. In the above embodiment, the optical connector ferrule includes a plurality of optical fiber holding holes, but the invention can be applicable to a case that the optical connector ferrule includes a single optical fiber holding hole. In the above embodiment, the optical connector ferrule includes two inspection holes, but the number of the inspection holes may be one, or three or more in the present invention.

REFERENCE SIGNS LIST

1A . . . Optical connector, 10A to 10E . . . Optical connector ferrule, 10a . . . Ferrule end face, 10b . . . Rear end face, 10c, 10d . . . Lateral face, 10e . . . Bottom face, 10f . . . Top face, 13 . . . Optical fiber holding hole, 14 . . . Depressed part, 14a . . . First surface, 14b . . . Second surface, 15 . . . Introducing hole, 16 . . . Lens structure, 17, 18 . . . Inspection hole, 19a, 19b . . . Guide hole, 21, 22 . . . Mark, 23, 24 . . . Lens structure, 31 to 34 . . . Mold, 51 . . . Covering, F1 . . . Optical fiber bundle, F2 . . . Optical fiber.

The invention claimed is:

1. An optical connector ferrule, comprising:
a ferrule body made of resin, the ferrule body including a ferrule end face, rear end face opposite the ferrule end face, and a first surface located between the ferrule end face and the rear end face;
an optical fiber holding hole being a through-hole formed within the ferrule body and reaching the first surface, the optical fiber holding hole being configured to hold an inserted optical fiber;
a guide hole formed within the ferrule body and having an opening at the ferrule end face, the guide hole being configured to receive a guide pin;
a lens structure provided on an axis line of the optical fiber holding hole; and
an inspection hole being a through-hole formed along the optical fiber holding hole within the ferrule body and reaching the first surface and having an opening at the first surface, wherein the lens structure is not provided on an axis line of the inspection hole.

2. The optical connector ferrule according to claim 1, wherein the ferrule body further includes a second surface facing the first surface, and the ferrule end face is positioned on a back side of the second surface and the ferrule end face is configured to face a coupled-side optical connector ferrule,
wherein the lens structure is provided at least any of on the second surface, on the ferrule end face, and between the second surface and the ferrule end face, and
wherein the second surface and the ferrule end face are flat on at least an axis line of the inspection hole, and refractive-index distribution in an area between the second surface and the ferrule end face is uniform.

3. The optical connector ferrule according to claim 1, wherein an inner diameter of the inspection hole is equal to an inner diameter of the optical fiber holding hole.

4. The optical connector ferrule according to claim 1, wherein the optical fiber holding hole includes a plurality of holding holes, the lens structure includes a plurality of lenses respectively provided on axis lines of the respective holding holes, and the inspection hole includes first and second inspection holes, and
wherein openings of the plurality of holding holes on the first surface are formed to be aligned in one row or a plurality of rows, an opening of the first inspection hole on the first surface is formed alongside of one end of any of the rows, and an opening of the second inspection hole on the first surface is formed alongside of the other end of any of the rows.

5. The optical connector ferrule according to claim 2, further comprising a mark for positional adjustment with respect to the inspection hole, the mark being provided at least any of on the second surface, on the ferrule end face, and between the second surface and the ferrule end face.

6. The optical connector ferrule according to claim 5, wherein the mark is formed into a protruded shape having a flat part overlapping the axis line of the inspection hole.

7. The optical connector ferrule according to claim 5, wherein the mark has a circular shape when viewed in a direction of the axis line of the inspection hole.

8. The optical connector ferrule according to claim 7, wherein a diameter of the mark is different from an inner diameter of the inspection hole.

9. An optical connector comprising:
the optical connector ferrule according to claim 1; and
an optical fiber held by the optical fiber holding hole.

10. An optical connector ferrule, comprising:
a resin;
a first surface and a second surface facing the first surface;
a ferrule end face positioned on a back side of the second surface, the ferrule end face configured to face a coupled-side optical connector ferrule;
an optical fiber holding hole being a through-hole reaching the first surface, the optical fiber holding hole configured to hold an inserted optical fiber;
a lens structure provided on an axis line of the optical fiber holding hole; and
an inspection hole being a through-hole formed along the optical fiber holding hole and reaching the first surface,
wherein the second surface and the ferrule end face are flat on at least an axis line of the inspection hole, and refractive-index distribution in an area between the second surface and the ferrule end face is uniform.

11. The optical connector ferrule according to claim 10, wherein the lens structure is provided at least any of on the second surface, on the ferrule end face, and between the second surface and the ferrule end face.

12. The optical connector ferrule according to claim 10, wherein an inner diameter of the inspection hole is equal to an inner diameter of the optical fiber holding hole.

13. The optical connector ferrule according to claim 10, further comprising a mark for positional adjustment with respect to the inspection hole, the mark being provided at least any of on the second surface, on the ferrule end face, and between the second surface and the ferrule end face.

14. The optical connector ferrule according to claim 13, wherein the mark is formed into a protruded shape having a flat part overlapping the axis line of the inspection hole.

15. The optical connector ferrule according to claim 13, wherein the mark has a circular shape when viewed in a direction of the axis line of the inspection hole.

16. The optical connector ferrule according to claim 15, wherein a diameter of the mark is different from an inner diameter of the inspection hole.

17. An optical connector comprising:
the optical connector ferrule according to claim 10; and
an optical fiber held by the optical fiber holding hole.

18. An optical connector ferrule, comprising:
a resin;
an optical fiber holding hole being a through-hole reaching a first surface, the optical fiber holding hole configured to hold an inserted optical fiber;
a lens structure provided on an axis line of the optical fiber holding hole; and
an inspection hole being a through-hole formed along the optical fiber holding hole and reaching the first surface, wherein the optical fiber holding hole includes a plurality of holding holes, the lens structure includes a plurality of lenses respectively provided on axis lines of the respective holding holes, and the inspection hole includes first and second inspection holes, and
wherein openings of the plurality of holding holes on the first surface are formed to be aligned in one row or a plurality of rows, an opening of the first inspection hole on the first surface is formed alongside of one end of any of the rows, and an opening of the second inspection hole on the first surface is formed alongside of the other end of any of the rows.

19. An optical connector comprising:
the optical connector ferrule according to claim 18; and
optical fibers held by the respective holding holes of the optical fiber holding hole.

* * * * *